United States Patent [19]

Stevens

[11] Patent Number: 4,563,616
[45] Date of Patent: Jan. 7, 1986

[54] NON-SATURATING, SELF-DRIVEN SWITCHING INVERTER FOR GAS DISCHARGE DEVICES

[76] Inventor: Carlile R. Stevens, 468 El Rio Rd., Danville, Calif. 94526

[21] Appl. No.: 503,766

[22] Filed: Jun. 13, 1983

[51] Int. Cl.$^4$ ............................................. H05B 37/02
[52] U.S. Cl. .................................... 315/220; 315/219; 315/226; 315/DIG. 7
[58] Field of Search .......... 315/220, 226, 219, DIG. 7

[56] References Cited

U.S. PATENT DOCUMENTS

| | | | |
|---|---|---|---|
| 3,453,520 | 7/1969 | Mas | 331/113 A |
| 3,506,908 | 4/1970 | Resch | 331/113 A |
| 4,042,855 | 8/1977 | Buenzli | 331/113 A |
| 4,259,614 | 3/1981 | Kowler | 315/219 |

Primary Examiner—Harold Dixon
Attorney, Agent, or Firm—Roger A. Marrs

[57] ABSTRACT

A non-saturating, self-driven switching inverter for a gas discharge device is disclosed herein having an inverter transformer including primary and secondary windings coupled respectively to alternately applied power and a pair of switching transistors. A resistive network coupled between the secondary winding and the bases of the switching transistors for conducting power for alternately polarizing the transistors in the ON state or condition. A diode network is connected in parallel with the resistive network to selectively reduce impedance of the secondary winding.

6 Claims, 3 Drawing Figures

NON-SATURATING, SELF-DRIVEN SWITCHING INVERTER FOR GAS DISCHARGE DEVICES

BACKGROUND OF THE INVENTION

1. Field of the Invention

The present invention relates to devices for supplying high frequency current and voltage to power gas discharge light sources and more particularly to a novel switching inverter employed whenever direct current and voltage requirements are to be converted to alternating current and voltage at a desired frequency.

2. Brief Description of the Prior Art

Gas discharge light sources such as fluorescent lights especially those using high intensity mercury vapor, high pressure sodium, and low pressure mercury, have a negative impedance characteristic and must be operated with a ballasting device that controls the current through the source regardless of impedance changes.

It has been shown that if this current is high frequency in nature, a higher efficiency will be produced in generating light. The simplest circuit is a self-driven, high frequency inverter where current from the inverter transformer is fed back to drive switching transistors.

Simple, push-pull transistor inverters have been known for some time. The simplest form of a normal transistorized inverter uses a secondary winding arrangement on the driven transformer to supply the base drive to the transistors, either with a center tap winding or two separate windings, one for each transistor. This circuit performs well, but has some very basic inefficiencies. These inefficiencies have been tolerated due to the simplicity of design and low cost of energy. However, with the development of energy conservation, means to generate AC from DC at high efficiencies are now required. In the past, this normally has involved development of a driven inverter in which a separate circuit switches the transistors that then drive the power to the output transformer. In the self-driven circuit the output transformer must saturate before switching can occur. At saturation the OFF transistor is then turned to an ON state turning the On transistors to an OFF state. This means that both transistors are ON for a short period of time. However, due to what is called "Storage Time," the ON transistor remains in the ON state or condition until all of the charges have been moved from the junctions. This means that the time when both transistors are ON will be extended by this time, providing a temporary short circuit. High amounts of energy are consumed during this time and transient pulses that must be suppressed with energy dissipated elements are produced. The best efficiency that may be hoped from this type of circuit is around 70%, at very best 80%.

The circuit continues to have wide application and use because of its very low cost and the minimum number of parts producing high reliability. Prior electronic ballasts for fluorescent and other forms of gas discharged lighting, where high frequency current is needed, have used this circuit with a modest improvement in light operation. The typical output of this type of inverter is a square wave which has radio frequency radiation problems which reduce the effective efficiency in driving the lamp.

Recent attention on energy conservation has made it desirable to adjust the intensity of the lamp, either through local or remotely controlled dimming signals. Such circuits have not been developed to accomplish this and the small amount of prior art for dimming gas discharged tubes is exceptionally expensive, works over a very narrow range, and has been susceptible to flicker. Another prior art circuit worth considering is Letters U.S. Pat. No. 4,277,726.

Therefore, a long standing need has existed to provide a means of developing a self-driven switching inverter without the necessity to drive the switching transformer into saturation so that power losses caused by transformer core saturation are reduced as well as storage time switching delays in the switching transistors.

SUMMARY OF THE INVENTION

Accordingly, the above problems and difficulties are obviated by the present invention which provides a novel circuit wherein the transistor switching time is controlled in such a manner as to cause it to turn ON well ahead of the saturating of the main transistor transformer so as to allow the storage time of the ON transistor to continue to drive the inverter transformer until such time as all electrical charge has been removed from the junction and the transistor turns OFF. Once this has happened, the switching action drives the other transistor into the ON State. A further output conditioning section shapes the wave to the load, as well as providing the variable impedance to allow for the dimming.

In one form of the invention, the power supply, when configured as a ballast, is comprised of four major sections:

1. A DC power supply broken into three subsections:
   A. A DC power supplycomprising an RFI, EMI rejection filter for both incoming and outgoing RFI, EMI.
   B. Line rectification, typically a bridge rectifier.
   C. Filtering means small enough so as not to produce an undesirable power factor to the power line, but large enough to maintain continuous operation of the inverter.
2. An inverter comprised of a conventional push-pull switching transistor and center tap primary for the secondary coil to drive the conditioning circuit and load.
3. A frequency control section including the feedback drive winding on the main switching transformer with associated current limiting resistors start-up biased string and frequency determining inductor.
4. Output conditioning circuitry designed to supply a smooth wave form to the output for the reduction of harmonics, as well as to provide proper impedance characteristics for dimming with a change in frequency.

It is the object of this invention to produce a self-driven switching inverter that does not require the primary transformer to saturate to cause switching, thus reducing the losses in the transformer core.

It is another object of this invention to turn the ON transistor OFF prior to turning the OFF transistor ON, such that at no time will the two transistors be on together.

It is still a further object of this invention to drive a gas discharged light source in a highly efficient manner.

Yet another object of this invention is to drive such light source in a manner which may be adjustable so that the light ouput may be reduced with the corresponding reduction energy consumption.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

The following detailed description is of the best presently contemplated modes of carrying out the invention. The description is not to be taken in a limiting sense, but is made merely for the purpose of illustrating the general principles of the invention, since the scope of the invention is best defined by the appended claims. Operational characteristics, attributed to forms of the invention first described, also shall be attributed to forms later described, unless such characteristics obviously are unapplicable or unless specified exception is made.

Figure 1:
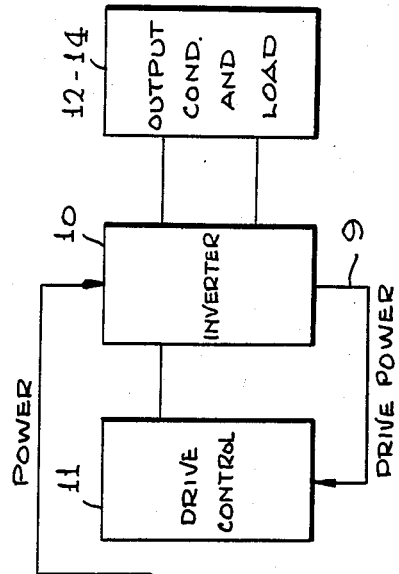
FIG. 1 is a block diagram illustrating the four basic areas as described above.
Figure 3:
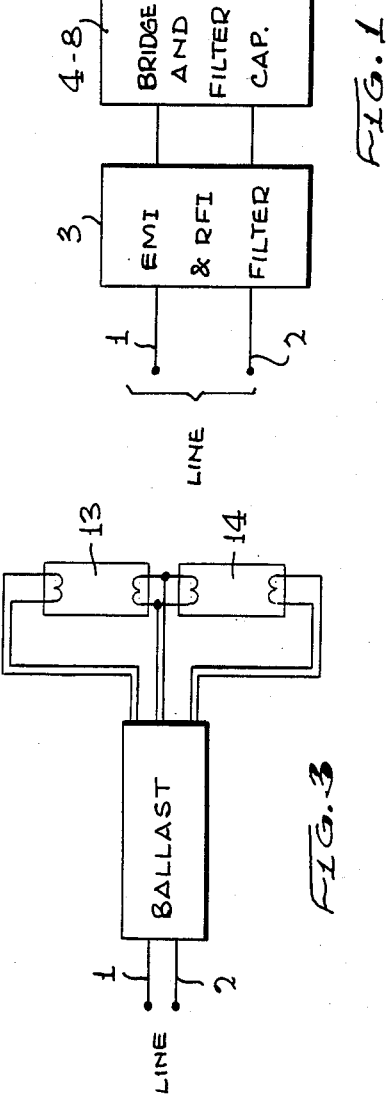
FIG. 3 is the typical industry installation showing line, ballast, and a two tube load.

In referring to FIG. 1, it can be seen that the block diagram illustrates the invention in a generalized form. There is an EMI or RFI filter 3 incorporated into a bridge rectifier and filter section 4-8. The output of this section is fed to an inverter section 10 which in itself supplies the drive power on line 9 to a drive section 11 and supplies an output conditioning and load section 12-14 which feed a load comprising of fluorescent tubes.

Figure 2:
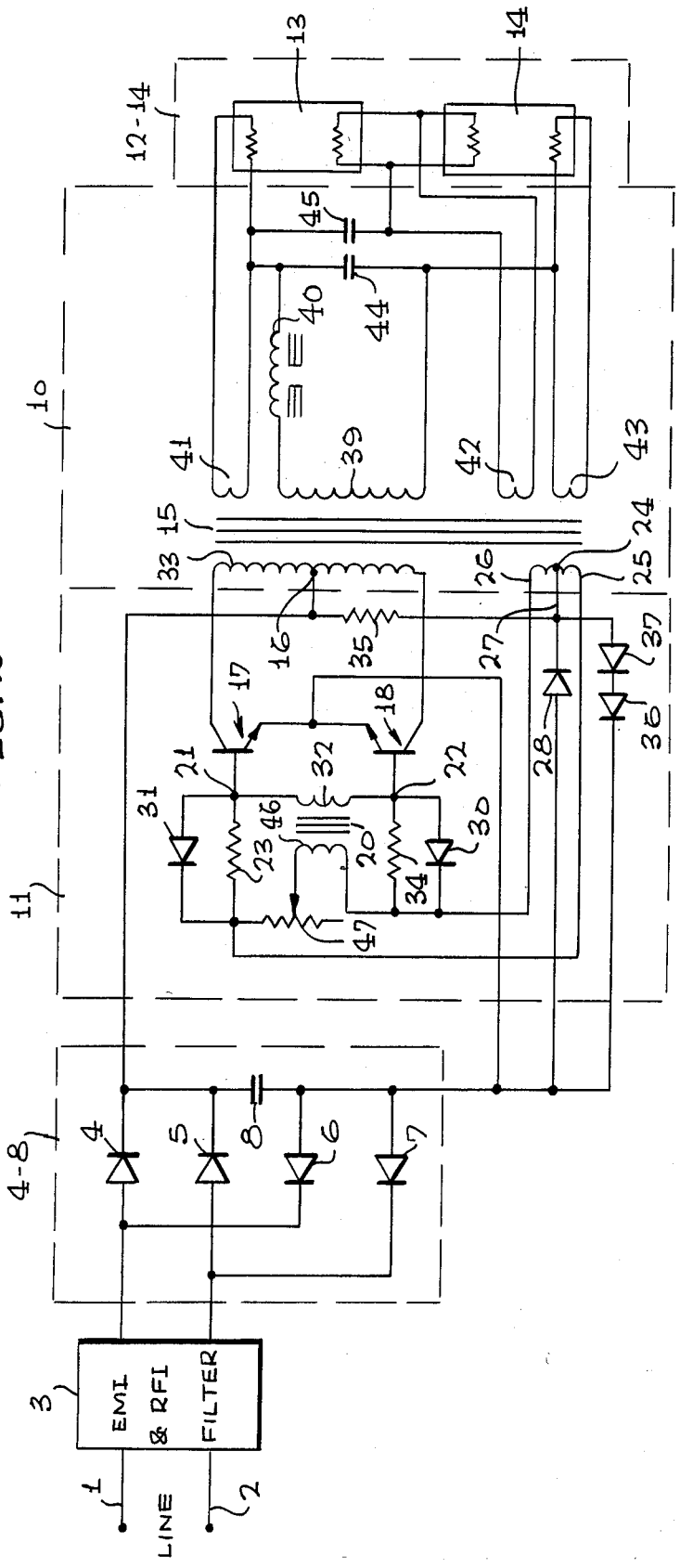
FIG. 2 is a schematic representation of the invention as a fluorescent ballast driving two tubes as is standard in the industry.

In referring to FIG. 2, the EMI/RFI filter 3 is shown as a block diagram since such devices are standard and may be purchased in the marketplace for any number of applications. Line power enters the system at leads 1 and 2 and passes through the filter 3 and is rectified by bridge rectifier diodes 4, 5, 6 and 7 to form a pulsating 120 Hertz direct current which is then filtered by a capacitor 8. The positive output of the bridge rectifier and capacitor filter is fed to a center tap of a transformer 15 at point 16. This transformer is driven in push-pull configuration by a pair of transistors 17 and 18.

The novel aspect of this invention is the inclusion of transformer 20 which bridges the bases of transistors 17 and 18 at points 21 and 22. The transformer 20 performs primarily as an inductor with the transformer action being used only to provide the dimming as will be discussed later.

The operation of the circuit is as follows: For illustration we will assume transistor 17 is in the ON state and the transistor 18 is in the OFF state. The drive current for transistor 17 is supplied through a resistor 23 from the winding 24 of transformer 15. This means that the end of the winding 25 is positive while the other end of winding 26 is negative. The center tap of winding 24 at 27 is held near common by diode 28 forming a reference point. Current passes through diode 28 through winding 24 out at point 25 through resistor 23 to the base emitter junction of transistor 17 and back to common. At the same time the base of transistor 18 is biased negative through diode 30 connected to the negative side of winding 24. This means there will be approximately 0.5 volts STET at point 21 base of transistor 17 and a much larger negative voltage at point 22 base of transistor 18. There is, therefore, a voltage across winding 32 of transformer 20. This winding performs as an inductor and draws only a small current until the core of transformer 20 reaches saturation. At that point the impedance of winding 32 drops to at or near zero. This conducts the negative potential from point 22 to point 21 biasing transistor 17 negative to turn it off along with transistor 18.

Transistor 17, however, does not turn off right away due to the storage time normally required in power transistors before turn off. In this circuit, however, the length of the storage time is not at all critical since transistor 18 is still off and the circuit waits until the storage time has elapsed and transistor 17 actually starts to turn off. Once transistor 17 is turned off the drop across the primary winding 33 of transformer 15 is no longer present. This means that no voltage will be present at winding 24 and the negative voltage heretofore supplied at point 23 will move towards zero. The current that has been flowing from point 21 to 22 in winding 32 of transformer 20 will continue to flow due to the inductive action of that winding. Without the negative bias from winding 24 supplied through diode 30 to point 22 the current from winding 32 will drive transistor 18 into the on condition. Once this has been achieved point 26 of the winding 24 will go positive driving the transistor further into the ON state through resistor 34. At this same time, point 25 of winding 24 will go negative supplying a negative bias at point 21 of transistor 17 through diode 31. The process will now be repeated in the opposite direction with current flowing through winding 32 of transformer 20 from point 22 back to point 21. This will continue until 32 again reaches saturation commencing to shut off transistor 18.

It can be seen from the above that as long as transformer 15 does not saturate, the frequency of the inverter will be determined by the length of time it takes to saturate transformer 20. By designing transformer 15 so that it does not even approach saturation during operation we greatly reduce losses due to core heating. Transistor losses are eliminated by the fact that one transistor is turned OFF before the next transistor is turned ON. Only the ON saturation voltage of the collector emitter junctions provides any form of loss and it is almost insignificant.

Resistor 35 and diodes 36 and 37 form a bias source which starts the oscillator when power is first applied. The forward drop of the two diodes providing a bias high enough that current will flow through resistor 35, through the windings of coil 24, to the two transistors 17 and 18 through their respective base resistors 23 and 34. Since no two transistors may be exactly matched, one transistor will turn ON a little more than the other. This unbalance is reflected through the transformer action of transformer 15 to coil winding 24 adding additional drive to the transistor that is turning ON and removing drive from the one that was not coming ON as fast. This process is regenative and the oscillation commences.

The output of the circuit is taken from winding 38 of transformer 15 and fed through inductor 40 to the load consisting of fluorescent tubes 13 and 14 connected in series. Windings 41, 42 and 43 provide the heater power to cause these tubes to operate properly. Capacitor 44 is selected to form a near resonant circuit with inductor 40 to supply a smooth close to sine wave drive to the lamps 13 and 14. The two values for inductor 40 and capacitor 44 are selected so that the output will appear inductive in nature for purposes which will be described shortly. Capacitor 45 is a starting assist capacitor which is quite small and therefore presents no appreciable impedance once the tubes are lit but does allow the open circuit voltage to be applied first to tube 14 so that it may light first. Once tube 14 is lit the voltage across 13 increases substantially and causes it to fire.

As previously stated, it is desirable to control the intensity of these lamps and winding 46 on transformer 20 accomplishes this affect. Potentiometer 47 adjusts current that is flowing in winding 46 and therefore changes the time taken to saturate the core and thus adjust the frequency. To dim the lamps the frequency is driven upwards. The inductive action of inductor 40 in the output provides less current to the load as the frequency goes up because its impedance increases.

Line regulation is also accomplished utilizing the shift in frequency. As higher line voltage is applied to the circuit, the voltage across winding 24 increases. This causes more voltage to be impressed across winding 32 of transformer 20 which causes it to saturate sooner increasing the frequency. As the frequency increases the impedance of inductor 40 increases compensating for the higher voltage appearing at the output of winding 39.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a DC to AC switching inverter, the combination comprising:
    an inverter transformer having a primary and a secondary winding;
    a pair of switching transistors connected to said secondary winding for alternately applying power to said transformer primary;
    said secondary winding of said transformer to provide drive alternately to said switching transistors;
    resistor means for conducting the power from said secondary winding of said transformer to the bases of said switching transistors such that they are alternatley polarized in an ON condition;
    diode means connected in parallel with each of said resistor means to reduce impedance for the connection of negatively polarized energy from said secondary winding of said transformer to as low as possible;
    means connected between the bases of said switching transistors operably coupled to connect said bases together and capable of conducting current in either direction;
    said means connected between the bases of said switching transistors consist of a saturable inductor selected to saturate resulting in operably coupling the two bases of said transistors together with a low impedance after a specified operating time from the first application of drive power to said transistors, said time to be less than the saturation of said inverter transformer.

2. The invention as defined in claim 1 wherein said inductor is a transformer with a first winding performing an inductor task and a second winding connected to increase or decrease the amount of time required to reach saturation.

3. In a DC to AC switching inverter, the combination comprising:
    an inverter transformer having a primary and a secondary winding;
    a pair of switching transistors connected to said secondary winding for alternately applying power to said transformer primary;
    said secondary switching of said transformer to provide drive alternatley to said switching transistors;
    resistor means for conducting the power from said secondary winding of said transformer to the bases of said switching transistors such that they are alternately polarized in an ON condition;

4. The invention as defined in claim 3 wherein:
    said means connected operably between the bases of said switching transistors shall be a saturable inductor selected to saturate to operably couple the two bases of said transistors together with a low impedance after a rectified time from the first application to drive power to said transistors, said time to be less than the saturation of said inverter transformer.

5. The invention as defined in claim 4 wherein:
    said inductor is a transformer with a first one winding performing the inductor task and a second winding connected to increase or decrease the amount of time required to reach saturation.
    diode means connected in parallel with each of said resistor means to reduce the impedance for the connection of negatively polarized energy from said secondary winding of said transformer to as low as possible;
    means connected between the bases of said switching transistors operably coupled to connect said bases together and capable of conducting current in either direction; and
    an output connection on any winding of said transformer for deriving an output signal for introduction to a circuit load via an inductor connected in series between said output connection and said circuit load.

6. In a DC to AC switching inverter, the combination comprising:
    an inverter transformer having a primary and a secondary winding;
    a pair of switching transistors connected to said secondary winding for alternately applying power to said transformer primary;
    said secondary winding of said transformer to provide drive alternately to said switching transistors;
    resistor means for conducting the power from said secondary winding of said transformer to the bases of said switching transistors such that they are alternately polarized in an ON condition;
    diode means connected in parallel with each of said resistor means to reduce the impedance for the connection of negatively polarized energy from said secondary winding of said transformer to as low as possible;

means connected between the bases of said switching transistors operably coupled to connect said bases together and capable of conducting current in either direction;

said DC to AC switching inverter is a non-saturating, self driven switching inverter for a gas discharge device constituting a load;

said resistor means includes at least a pair of resistors connected between the bases of said transistors and said secondary winding for conducting power for alternately polarizing said switching transistors in said ON condition; and said diode means including a pair of diodes connected in parallel with each of said resistors respectively to selectively reduce impedance of said secondary winding.

* * * * *